Figure 1:
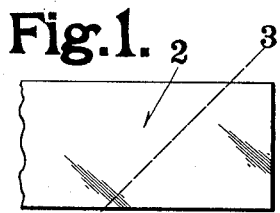

B. DICK.
CONDENSER TERMINAL AND METHOD OF FORMING SAME.
APPLICATION FILED SEPT. 17, 1915.

1,248,829.  
Patented Dec. 4, 1917.  
2 SHEETS—SHEET 1.

WITNESSES:  
Charles A. Becker

INVENTOR  
Burns Dick  
BY  
E. E. Huffman  
ATTORNEY

B. DICK.
CONDENSER TERMINAL AND METHOD OF FORMING SAME.
APPLICATION FILED SEPT. 17, 1915.
1,248,829.
Patented Dec. 4, 1917.
2 SHEETS—SHEET 2.
Fig.13.
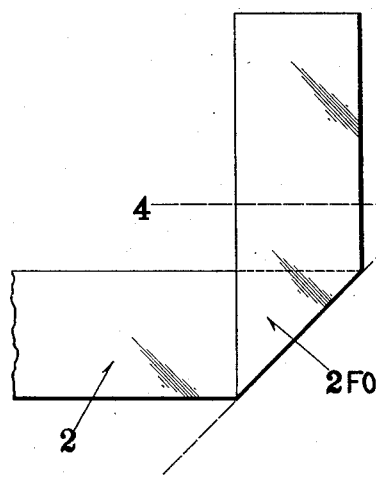
Fig.14.
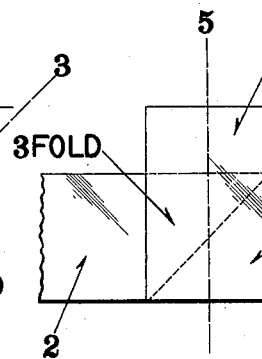
Fig.15.
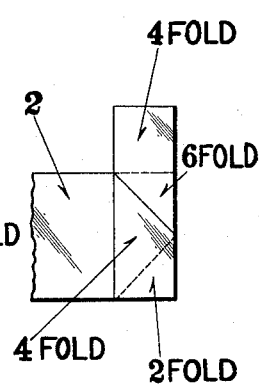
Fig.16.
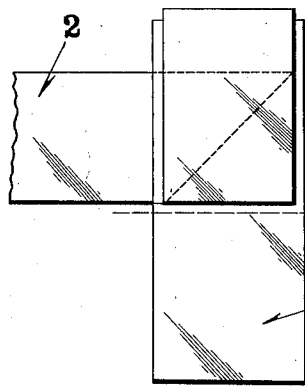
Fig.17.
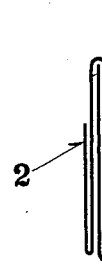
Fig.18.
Fig.19.
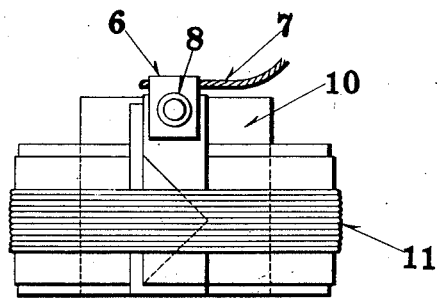
WITNESSES:
Charles A. Becker.
INVENTOR
Burns Dick
BY
E. S. Huffman
ATTORNEY

UNITED STATES PATENT OFFICE.

BURNS DICK, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

CONDENSER-TERMINAL AND METHOD OF FORMING SAME.

1,248,829.  Specification of Letters Patent.  Patented Dec. 4, 1917.

Application filed September 17, 1915. Serial No. 51,217.

*To all whom it may concern:*

Be it known that I, BURNS DICK, a subject of the King of England, residing at city of St. Louis, State of Missouri, United States of America, have invented a certain new and useful Condenser-Terminal and Method of Forming Same, of which the following is such a full, clear, and exact description as will enable any one skilled in the art to which it appertains to make and use the same, reference being had to the accompanying drawings, forming part of this specification.

My invention relates to a method of forming foil condenser terminals integral with the foil itself. It is particularly useful in connection with aluminum foil condensers, but can, of course, be used with tin or other foils. The conducting foil used in condensers is usually extremely thin and fragile, and it has been found difficult to make an electrically sound and mechanically strong connection between this foil and the line. A thin metal strip of considerably greater mechanical strength than the condenser foil itself has generally been placed into contact with the end of said condenser foil and made to project beyond the body of the condenser, thus forming a terminal. Contact between such terminal and the condenser foil can only be secured by pressing the two together and has been found to rapidly deteriorate. Foreign insulating substances, such as the impregnating material used in all foil condensers, are liable to get between the metal strip and the condenser foil, or the surfaces of either or both may become oxidized, thus very materially increasing the resistance of the circuit at that point and such terminal is also easily and frequently pulled out of place. The special object of this invention is to overcome these difficulties, and it is achieved by folding the end of the conducting foil to form from the foil itself a strong projecting terminal integral with the foil, and thus in best possible electrical connection therewith.

My invention will be better understood by reference to the accompanying drawings, Figures 1 to 6 of which show one way of folding the conducting foil for the purpose of forming the terminal, while Figs. 7 to 11 inclusive and 13 to 19 inclusive, show other ways of carrying out the invention.

Figures 11, 12:
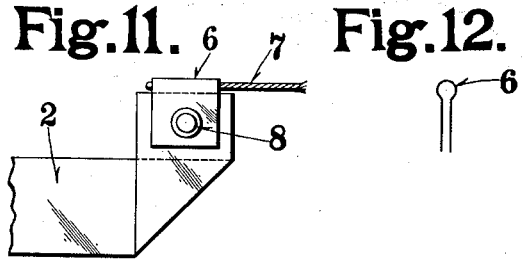
Figure 6:
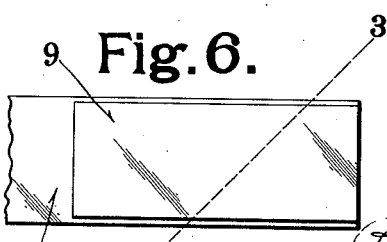

Fig. 12 is a side view of a connecting clip.

Figure 2:
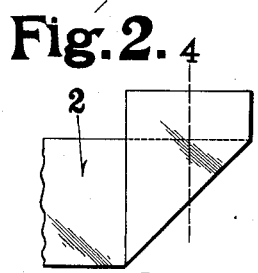
Figure 3:
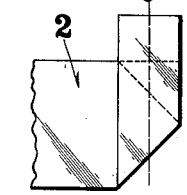
Figure 4:
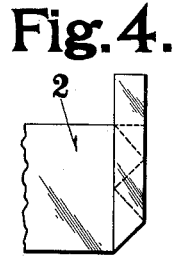
Figure 5:
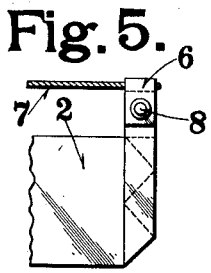

Referring to Figs. 1 to 5, the end of the conducting strip 2 is first folded along a diagonal line 3 into the shape shown in Fig. 2. The strip is next folded along the line 4 into the shape shown in Fig. 3. In Fig. 3 the projecting tab, which is to form the terminal of the strip 2, is made up of two thicknesses of foil. If this is not deemed sufficient for the purpose, then the foil is folded once more, along the line 5 of Fig. 3, thus securing a fourfold tab, as shown in Fig. 4. A metal clip 6, to which is soldered a flexible or other connector 7, is now slipped over the fourfold tab of Fig. 4 and secured to same by means of an eyelet 8. The maximum thickness of the folded part of the strip 2 occurs just below the tab in the top right-hand triangle. Here the thickness is eightfold. In the next lower triangle it is sixfold, then fourfold and twofold. Additional strength can be given to this terminal by placing on the end of the strip 2, a strip 9, shown in Fig. 6, and folding same with the foil 2, as indicated in Figs. 1 to 5 inclusive. This stiffening 9 may be of conducting or insulating material, and when used it makes it unnecessary to go beyond the operation shown in Fig. 3; in fact it is often sufficient to make the fold indicated in Fig. 2.

Figure 7:
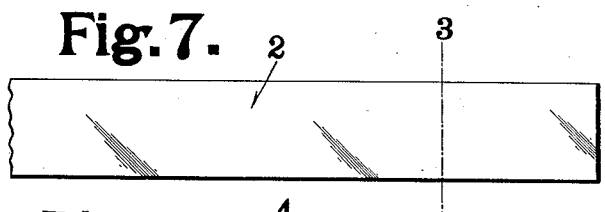
Figure 8:
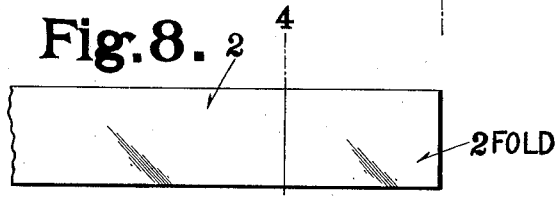
Figure 9:
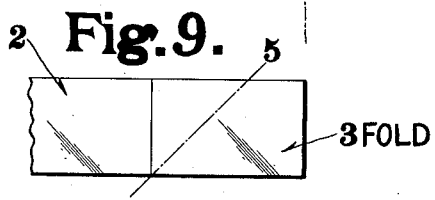
Figure 10:
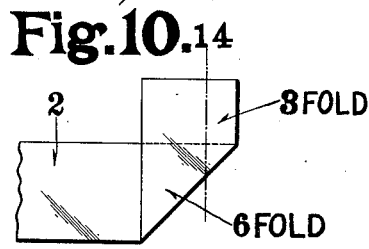

Figs. 7 to 11 inclusive show another way of folding the foil 2, for the purpose of producing a suitable terminal. The end of the strip is first folded back along the line 3, as shown in Fig. 7, making the end of the foil twofold, as shown in Fig. 8. Then this foil is folded along the line 4 of Fig. 8, producing the threefold end shown in Fig. 9. After this, the threefold end is folded along the diagonal line 5 of Fig. 9, thus producing the threefold tab shown in Fig. 10. The thickest part of this folded terminal is sixfold. The cable 7 is fastened to the tab as previously, the complete terminal being illustrated in Fig. 11. If it be desired to strengthen this terminal, this can be done by including a stiffening piece, such as 9 of Fig. 6, within the folds shown in Fig. 7 to 10 inclusive. If too wide, the terminal can be reduced to the desired amount by cutting part of it off, for example, along the line 14 of Fig. 10.

The preferred manner of folding the foil 2 is shown in Figs. 13 to 19 inclusive. The foil is first folded along the diagonal 3, as indicated in Fig. 13, then along the line 4, shown in that figure, thus producing the arrangement shown in Fig. 14. A last fold is made along the line 5 of said figure, producing the fourfold tab shown in Fig. 15. This figure shows that the maximum thickness of the folded part is sixfold. If it be desired to strengthen this terminal mechanically then a stiffening piece 9 can be slipped under the top layer, after the second fold, as shown in Fig. 16, and then folded back over the top layer along the line 12. An end view of this arrangement is shown in Fig. 17. The appearance of the terminal after the last fold along the line 5 of Fig. 14, when the stiffening slip 9 is used, is shown in Fig. 18, which also shows how the cable is attached to the tab. Fig. 19 represents a complete condenser of circular shape, held together by the string 11. In order to further stiffen and protect the terminal, a stiff piece 10 of press-spahn or similar material may be inserted between some layers of the condenser and forms a backing for the tab to which the cable is attached. In fact, the clip 6 is, in this case, best slipped over the tab and over the stiffening piece 10, being tightly connected to both by means of the eyelet 8.

Having fully described my invention, what I claim as new and desire to secure by Letters Patent of the United States is:

1. The method of forming a terminal for a foil condenser which comprises making a plurality of folds in the end of a foil strip forming one electrode of the condenser, one of said folds being made along a line at an oblique angle to a lateral edge of the strip.

2. The method of forming a terminal for a foil condenser which consists in first folding an end of a condenser foil strip along a line at an oblique angle to a lateral edge thereof, then folding the laterally extending portion thus formed at right angles to the direction of its length and finally folding the folded portion then formed at right angles to the direction of the length of the condenser foil strip.

3. In a foil condenser, a terminal comprising a strip of reinforcing material and a strip of foil attached thereto and integral with a foil strip of the condenser and projecting beyond the lateral edge thereof.

4. In a foil condenser, a terminal formed of a plurality of layers of foil integral with each other and with a foil strip of the condenser, said terminal projecting beyond a lateral edge of the foil strip, a contact plate clamped to the said terminal, and means for holding the lower portion of the terminal firmly against the body of the condenser.

5. In a foil condenser, a terminal formed of a plurality of layers of foil integral with each other and with a foil strip of the condenser, said terminal projecting beyond a lateral edge of the foil strip, and a reinforcing strip adjacent to the terminal and clamped thereto.

6. The combination in a foil condenser of a terminal formed of folds of the foil itself and projecting from the body of the condenser, and a reinforcing member situated between the foil layers of the terminal.

7. In a foil condenser, a terminal comprising a strip of foil integral with a foil strip of the condenser, a strip of reinforcing material adjacent to said terminal foil strip, and means holding the lower portion of said reinforcing strip against the body of the condenser.

8. In a foil condenser, a terminal formed of a plurality of layers of foil integral with each other and with a foil strip of the condenser, said terminal projecting beyond a lateral edge of the foil strip and having a thickness of several layers at the point where it crosses said edge.

In testimony whereof, I have hereunto set my hand and affixed my seal in the presence of two subscribing witnesses.

BURNS DICK. [L. S.]

Witnesses:
HARRY HENZE,
I. DOZIER.